J. E. CARLSON & G. J. NASON.
ROLLER HARROW.
APPLICATION FILED APR. 23, 1912.
1,042,889.
Patented Oct. 29, 1912.
2 SHEETS—SHEET 1.
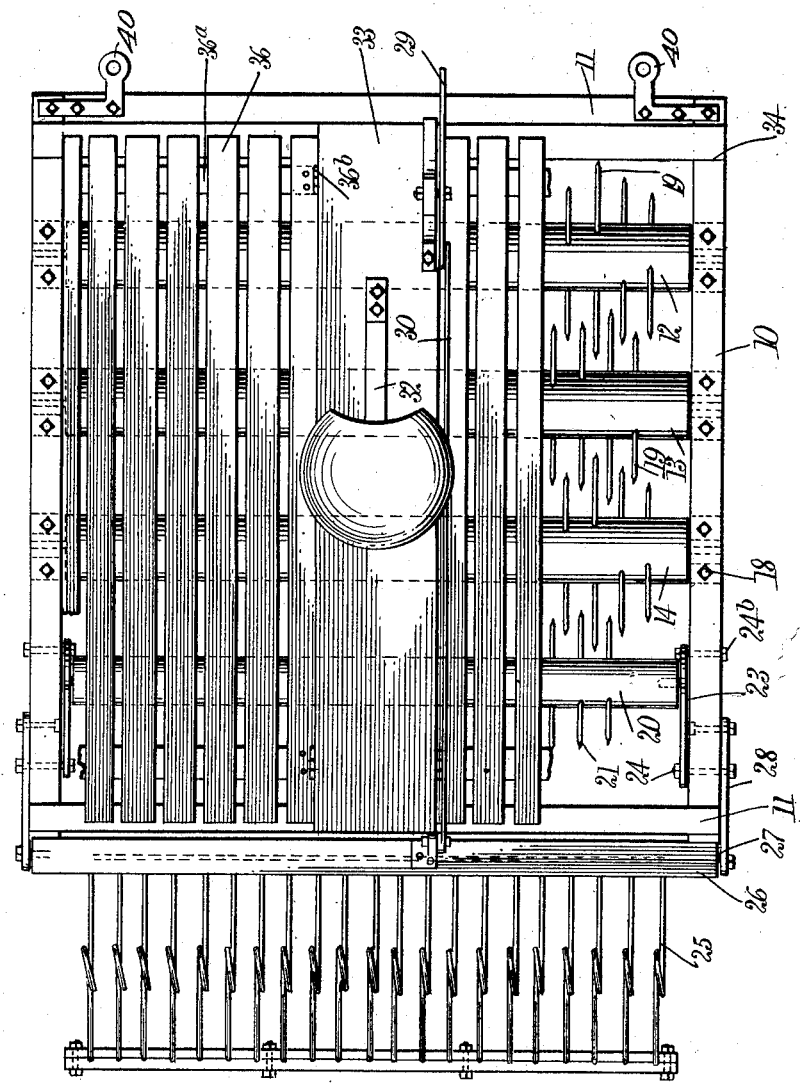
WITNESSES
INVENTORS
John E. Carlson
George J. Nason
BY
ATTORNEYS J. E. CARLSON & G. J. NASON.
ROLLER HARROW.
APPLICATION FILED APR. 23, 1912.
1,042,889.
Patented Oct. 29, 1912.
2 SHEETS—SHEET 2.
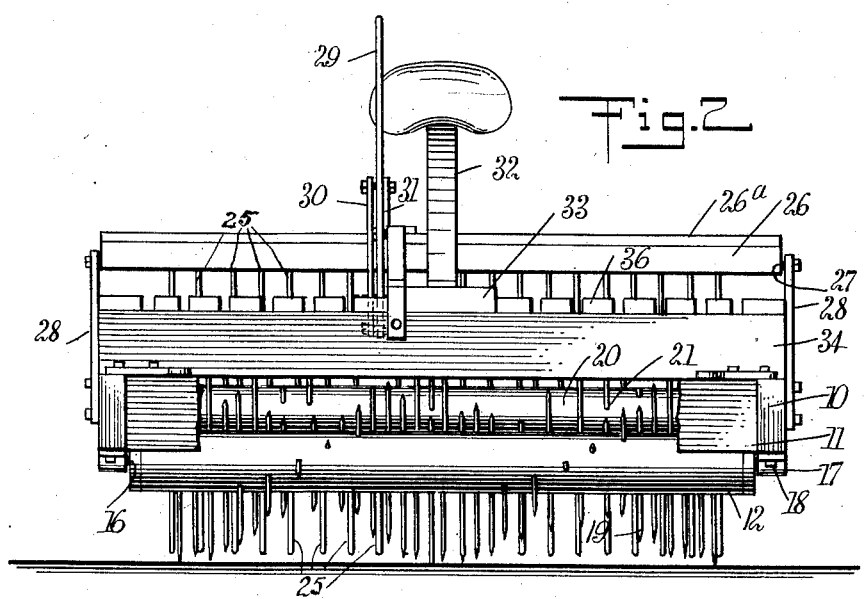
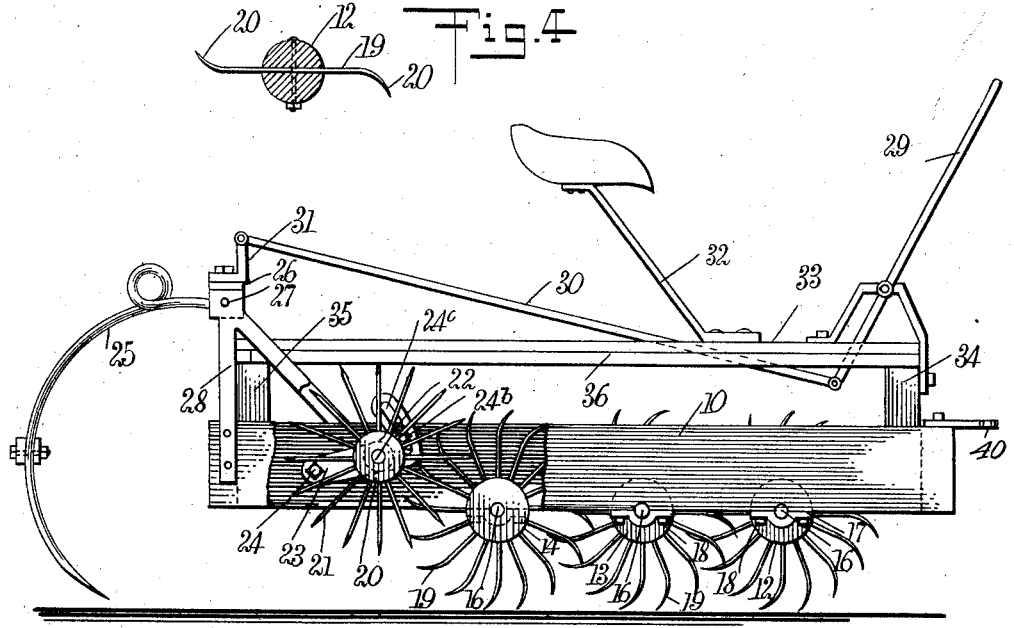
WITNESSES
INVENTORS
John E. Carlson
George J. Nason
BY
ATTORNEYS

UNITED STATES PATENT OFFICE.

JOHN E. CARLSON AND GEORGE J. NASON, OF BAKERSFIELD, CALIFORNIA.

ROLLER-HARROW.

1,042,889.  Specification of Letters Patent.  Patented Oct. 29, 1912.

Application filed April 23, 1912. Serial No. 692,575.

*To all whom it may concern:*

Be it known that we, JOHN E. CARLSON and GEORGE J. NASON, citizens of the United States, and residents of Bakersfield, in the county of Kern and State of California, have invented a new and Improved Roller-Harrow, of which the following is a full, clear, and exact description.

Our invention relates to that form of harrow in which rollers are employed provided with fingers so arranged as to harrow the ground. The teeth in rollers of this character are usually curved to have a better action in taking up weeds, stalks, and the like.

The object of our invention is to improve harrows of the indicated character, by providing an improved means for clearing the harrow rollers of trash, since it has been demonstrated in practice that the effectiveness of the roller harrow is greatly lessened by the collection of weeds and trash on the teeth.

In our improved implement the harrow rollers very effectively harrow the ground and pick up the weeds, stalks and trash, the successive rollers passing the gathered material rearwardly to the rearmost harrow roller; and an improved clearing roller that we have provided behind the rearmost harrow roller clears the accumulated material from the harrow teeth and deposits the same on the surface of the ground in a position to be readily taken up by a rake provided on the harrow frame at the rear, and by means of which rake the material taken off the harrow rollers by the clearing roller is gathered and deposited in windrows.

The distinguishing features of the invention and the important elements in the illustrated structural embodiment thereof will be more particularly explained in the specific description hereinafter to be given.

Reference is to be had to the accompanying drawings forming a part of this specification, in which similar characters of reference indicate corresponding parts in all the views.

Figure 1 is a plan view of a roller harrow embodying our invention; Fig. 2 is a front elevation thereof; Fig. 3 is a side elevation with the frame partly broken away; and Fig. 4 is a detail cross sectional view of one of the harrow rollers.

In constructing the roller harrow in accordance with our invention, longitudinal side bars 10 are provided, united at the front and rear by cross bars 11, and on the said frame, at the under side, a series of harrow rollers 12, 13, 14, are mounted in any suitable manner, as by providing journals or pins 16 on the ends of the rollers, said pins having bearings on boxes or bearing plates 17 secured to the frame bars 10 as by bolts 18. Each harrow roller is provided with teeth 19, having the ends 20 thereof curved in opposite directions, as clearly shown in Figs. 3 and 4, the curvature being such that the outer ends of the teeth, when the ends are at the under side of the roller, will curve rearwardly, the convexed surface being forward and the concave surface of the teeth rearward. The rollers are sufficiently close together that the teeth will overlap at adjacent sides of the two adjacent rollers.

With the described construction the trash, stalks, etc., picked up by the teeth of the front roller 12, will be taken off of the same by the next succeeding roller 13, which in turn will deliver its accumulated material to the rearmost roller 14. The curved form of the teeth is necessary for the effective harrowing and for the picking up of the trash and stalks, but the material accumulates on the last roller and cannot readily free itself, for which reason we provide a special clearing roller 20 in the rear of the last harrow roller 14, and we so mount the roller 20 and so form the teeth 21 thereof, that it will clear the last roller 14 of its accumulated material and deposit the material on the surface of the ground, to be taken up by the rake 25. The roller 20 is mounted at a higher point than the harrow roller, as clearly shown in Figs. 2 and 3, and the teeth 21 of the clearing roller are advantageously straight.

In practice, the weight of the implement and of the driver serves to press the harrow teeth 19 into the ground so that the surfaces of the rollers 12, 13, 14, rest on the surface of the ground and roll thereon. The roller 20, however, is so positioned and proportioned that the ends 21 of the teeth will be pressed into the ground only sufficiently to revolve the clearing roller. The teeth 21 of the roller 20 overlap the teeth 19 of the rearmost harrow roller. We provide means for adjustably mounting the roller 20 in the frame, so as to adjust the roller relatively to the surface of the ground and relatively to the rear harrow roller 14. In the form shown, the roller has its journal pins 22 mounted in plates 23 pivoted as at 24 on the longitudinal frame bars 10, and said plates 23 are each formed with a curved slot 24ᶜ, through which passes a bolt 24ᵃ provided with a nut 24ᵇ for holding the plate in adjusted position. The rake teeth 25 are preferably curved and mounted on a bar 26, which is journaled by its ends as at 27 in brackets 28 and may have a strengthening top plate 26ᵃ; the bar 26 is adapted to be rocked by a lever 29, connecting by a rod 30 with an angle iron 31 on the bar 26. The lever 29 is mounted in a position to be reached from the driver's seat 32, which seat is mounted on a central longitudinal member 33 of the frame, the ends of the member 33 being supported on front and rear cross bars 34, 35. To protect the harrow teeth and the clearing teeth, any suitable cover strips 36 are provided on the harrow, and may be united by cross pieces 36ᵃ, and hinged to be raised as by hinges 36ᵇ, as indicated in Fig. 1.

Any suitable draft device may be provided for the hitching of the draft animals; we have shown angle irons 40, suitable for the purpose.

Having thus described our invention, we claim as new and desire to secure by Letters Patent,—

1. A roller harrow comprising a harrow roller having curved teeth, and a clearing roller in the rear of the harrow roller and provided with straight teeth, the clearing roller having means for adjusting it relative to the surface of the ground and relatively to the harrow roller.

2. A roller harrow comprising a frame, a series of harrow rollers having curved teeth, the teeth of the rollers overlapping, said harrow rollers having their rolling surfaces below the frame to contact with the ground as the harrow teeth embed themselves in the ground, and a clearing roller behind the rearmost harrow roller, the clearing roller being provided with straight teeth and being mounted in the frame at a higher point than the harrow roller so that the clearing roller does not roll on the ground.

In testimony whereof we have signed our names to this specification in the presence of two subscribing witnesses.

JOHN E. CARLSON.
GEORGE J. NASON.

Witnesses:
JAMES G. DENIS,
WILLIAM NAIL.